(12) United States Patent
Miller et al.

(10) Patent No.: US 8,798,411 B1
(45) Date of Patent: Aug. 5, 2014

(54) SWITCHING SYSTEM FOR OPTICAL FIBER CONNECTION

(75) Inventors: Kevin Christopher Miller, Herndon, VA (US); Christopher I. Hendrie, Centreville, VA (US)

(73) Assignee: Amazon Technologies, Inc., Reno, NV (US)

( * ) Notice: Subject to any disclaimer, the term of this patent is extended or adjusted under 35 U.S.C. 154(b) by 91 days.

(21) Appl. No.: 13/414,539

(22) Filed: Mar. 7, 2012

(51) Int. Cl.
*G02B 6/26* (2006.01)
*G02B 6/42* (2006.01)

(52) U.S. Cl.
USPC ............................................................ 385/26

(58) Field of Classification Search
USPC ................................................................ 385/26
See application file for complete search history.

(56) References Cited

U.S. PATENT DOCUMENTS

| | | | |
|---|---|---|---|
| 4,447,114 A * | 5/1984 | Koene | 385/26 |
| 4,850,670 A | 7/1989 | Mathis et al. | |
| 4,896,937 A | 1/1990 | Kraetsch et al. | |
| 5,828,800 A * | 10/1998 | Henry et al. | 385/20 |
| 2008/0008417 A1 | 1/2008 | Gilbert et al. | |
| 2011/0206367 A1 | 8/2011 | Gilbert et al. | |

* cited by examiner

*Primary Examiner* — Ryan Lepisto
(74) *Attorney, Agent, or Firm* — Robert C. Kowert; Meyertons, Hood, Kivlin, Kowert & Goetzel, P.C.

(57) ABSTRACT

A fiber optic connection system includes a fiber optic switching device, a first optical fiber holder, and a second optical fiber holder. The fiber optic switching device includes optical waveguides and an optical waveguide carrier that carries the optical waveguides. The first optical fiber holder holds a first set of optical fibers at a first location relative to the optical waveguide carrier. A second optical fiber holder holds a second set of optical fibers at a second location relative to the optical waveguide carrier. The optical waveguide carrier is movable to position the one or more optical waveguides such that the optical waveguides optically couple the optical fibers in the first set of optical fibers to optical fibers in the second set of optical fibers.

37 Claims, 9 Drawing Sheets

SWITCHING SYSTEM FOR OPTICAL FIBER CONNECTION

BACKGROUND

Many companies and other organizations operate computer networks that interconnect numerous computing systems to support their operations and the services they provide to their end customers distributed worldwide. For example, data centers housing significant numbers of interconnected computing systems have become commonplace, such as private data centers that are operated by and on behalf of a single organization, and public data centers that are operated by entities as businesses to provide computing resources to customers. In many cases providers set up large networks that may logically span several regions or even countries, and may include numerous data centers with varying levels of services and facilities available, utilized together to provide a unified set of services to their end customers.

Many high capacity networks use fiber optic connections to transfer data both internal and external to a network facility. Many fiber optic cables may include a pair of strands. In a typical paired fiber arrangement, one strand in the pair carries optical signals in one direction (for example, from component A to component B), and the other strand carries optical signals in the other direction (for example, from component B to component A).

In many cases, a fiber optic path between systems includes several connector junctions. For example, a fiber optic path between components in a data center may include connector junctions at server I/O panels, patch panels, and building entry points. Each connector junction may require service personnel to make a connection between the strands on either side of the junction. In some cases, the two strands may be inadvertently reversed at a location in the path. In such case, the line A and B line path will be broken at the point of the junction, and the fiber optic connection will fail to operate. For example, if a connector is installed 180 degrees out of alignment, a fiber optic transmitter of a component A may be connected to a fiber optic transmitter in component B, rather than to a complementary fiber optic receiver in component B.

In cases in which a fiber optic path includes a reversed connection, service personnel may be dispatched to troubleshoot and correct the problem (for example, to find a reversed connector installation). Such troubleshooting and correction may be labor-intensive and result in lost operating capacity in the facility.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for systems and methods for establishing and switching fiber optic connections are described. According to one embodiment, a system for rolling over a fiber optic connection includes a fiber optic switching device, a first optical fiber holder, and a second optical fiber holder. The fiber optic switching device includes a first pair of optical waveguides (for example, optical fibers), a second pair of optical waveguides, and an optical waveguide carrier that is movable between a first position and a second position. The first can hold a first pair of optical fibers at a first location relative to the optical waveguide carrier. The second optical fiber holder can hold a second pair of optical fibers at a second location relative to the optical waveguide carrier. When the optical waveguide carrier is in the first position, the first pair of optical waveguides optically couples the first pair of optical fibers to the second pair of optical fibers in a first combination. When the optical waveguide carrier is in the second position, the second pair of optical waveguides optically couples the first pair of optical fibers to the second pair of optical fibers in a second combination. The second combination crosses the connection of the optical fibers relative to the first combination.

According to one embodiment, a system for establishing a fiber optic connection includes a fiber optic switching device, a first optical fiber holder, and a second optical fiber holder. The fiber optic switching device includes one or more optical waveguides and an optical waveguide carrier that carries the optical waveguides. The first optical fiber holder holds a first set of one or more optical fibers at a first location relative to the optical waveguide carrier. A second optical fiber holder holds a second set of one or more optical fibers at a second location relative to the optical waveguide carrier. The optical waveguide carrier is movable to position at least one of the one or more optical waveguides such that the at least one of the one or more optical waveguides optically couples at least one of the one or more optical fibers in the first set of optical fibers to at least one of the one or more optical fibers in the second set of optical fibers.

According to one embodiment, a fiber optic connection panel system includes two or more receptacles that receive optical fibers and one or more fiber optic switching devices. Each of the fiber optic switching devices may include one or more optical waveguides and an optical waveguide carrier that carries the optical waveguides. The optical waveguide carrier may be movable to position the optical waveguides to optically couple optical fibers received in one of the receptacles with optical fibers in another of the receptacles According to one embodiment, a method of establishing a fiber optic connection includes placing the ends of a first set of one or more optical fibers (for example, a pair of optical fibers) in a first location and placing the ends of a second set of one or more optical fibers (for example, a pair of optical fibers) in a second location. An optical waveguide carrier may be moved to position a set of one or more optical waveguides on the carrier such that the optical waveguides optically couple optical fibers in the first set of optical fibers to optical fibers in the second set of optical fibers in the second location.

As used herein, to "align" optical elements with one another means to position or orient the elements such that optical signals can transfer from one of the optical elements to the other one of the optical elements.

As used herein, "carrier" means any element or combination of elements that carries another element or elements.

As used herein, "movable" means that at least a portion of an element can be moved with respect to a fixed point. As one example, an element that rotates about a fixed axis or structure is a movable element.

As used herein, "optical waveguide" means any element, structure, device, or combination thereof, that can guide light waves. Examples of waveguides include an optical fiber, rectangular waveguide, or combination thereof.

As used herein, to "optically couple" means to connect optical elements such that at least a portion of an optical signal from one of the elements is transmitted to the other element.

As used herein, "rolling over" a fiber optic connection means to shift or swap at least two fibers at a junction between one set of optical fibers and an adjoining set of optical fibers in a connection. Rolling over a pair of fibers in a connection includes swapping the connection of the fibers at the junction. For example, if an "a" strand of an input is coupled to an "a" strand of an output and a "b" strand of an input is coupled to an "b" strand of an output, rolling the fibers includes swapping the fibers such that the "a" strand of the input is coupled to the "b" strand of the output and the "b" strand of the input is coupled to the "a" strand of the output.

As used herein, "strand" means an optical fiber (for example, one optical fiber in an optical fiber cable).

As used herein, a "cable" includes any cable, conduit, or line that carries one or more conductors and that is flexible over at least a portion of its length. A cable may include a connector portion, such as a plug, at one or more of its ends.

As used herein, "computing device" includes any of various devices in which computing operations can be carried out, such as computer systems or components thereof. One example of a computing device is a rack-mounted server. As used herein, the term computing device is not limited to just those integrated circuits referred to in the art as a computer, but broadly refers to devices including a processor, a microcontroller, a microcomputer, a programmable logic controller (PLC), an application specific integrated circuit, and other programmable circuits, and these terms are used interchangeably herein. Some examples of computing devices include e-commerce servers, network devices, telecommunications equipment, medical equipment, electrical power management and control devices, and professional audio equipment (digital, analog, or combinations thereof). In various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "data center" includes any facility or portion of a facility in which computer operations are carried out. A data center may include servers dedicated to specific functions or serving multiple functions. Examples of computer operations include information processing, communications, simulations, and operational control.

In various embodiments, a system for establishing a fiber optic connection includes a switching device with at least one optical waveguide on a movable carrier. The carrier is movable to position the optical waveguide(s) to optically couple one or more optical fibers held at one location to one or more optical fibers at another location. For example, optical fibers in a connector on one side of a connection panel may be coupled to optical fibers in a connector on the other side of the connection panel.

Fiber Connection Rollover System

In some embodiments, a system includes a fiber optic switching device that can roll over a fiber optic connection at a junction between two pairs of optical fibers. The fiber optic switching device may include two pairs of optical waveguides. Each of the optical waveguides pairs may be active when a carrier for the optical waveguides is in a different position. One of the optical waveguide pairs in the switching device couples the optical fibers in a crossed combination relative to the other pair of optical waveguides in the switching device (for example, a-to-b and b-to-a, instead of a-to-a and b-to-b).

Figure 1:
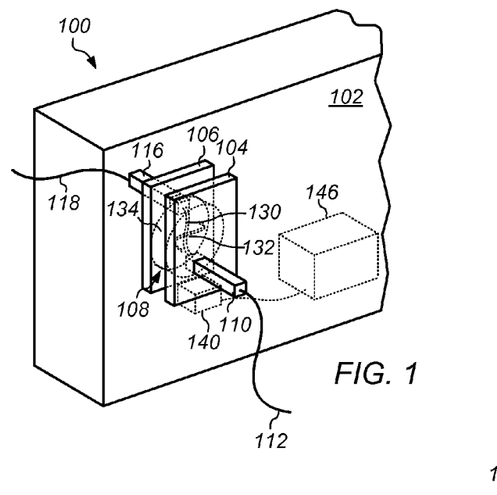
FIG. 1 illustrates one embodiment of a system for establishing an optical fiber connection.
Figure 2:
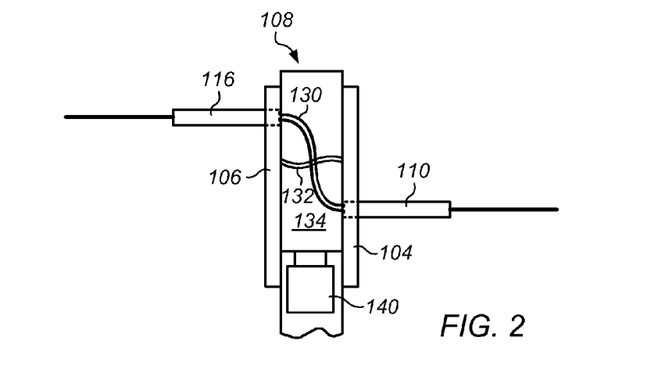
FIG. 2 is a side view illustrating one embodiment of a system for establishing on optical fiber connection.

FIG. 1 illustrates one embodiment of a system for establishing an optical fiber connection. FIG. 2 is a side view illustrating one embodiment of a system for establishing on optical fiber connection. System 100 includes fiber optic connection panel 102, front-side optical fiber holding device 104, back-side optical fiber holding device 106, and fiber optic switching device 108. Front-side optical fiber holding device 104 and back-side optical fiber holding device 106 may be attached to fiber optic connection panel 102.

Front-side optical fiber holding device 104 may receive and support fiber optic connector plug 110 of fiber optic cable 112. Back-side optical fiber holding device 106 may receive and support fiber optic connector plug 116 of fiber optic cable 118.

Fiber optic switching device 108 is housed in fiber optic connection panel 102. Fiber optic switching device 108 is housed in fiber optic connection panel 102. Fiber optic switching device 108 includes a first pair of optical waveguides 130, a second pair of optical waveguides 132, and optical waveguide carrier 134. System 100 includes drive mechanism 140 and controller 146. Controller 146 may be coupled to drive mechanism 140. Controller may be operated to rotate optical waveguide carrier 134. Rotation of optical waveguide carrier may change the positions first pair of optical waveguides 130 and a second pair of optical waveguides 132. First pair of optical waveguides 130 and a second pair of optical waveguides 132 may be used to optically couple fibers in front-side fiber optic connector plug 110 with fibers in back-side fiber optic connector plug 116.

Figure 3:
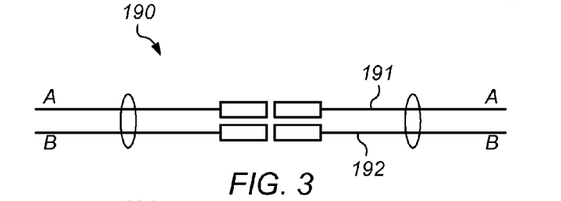
FIG. 3 is a schematic diagram illustrating a straight-through connection.
Figure 4:
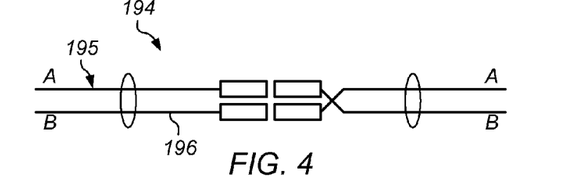
FIG. 4 is a schematic diagram illustrating one embodiment of a crossed over connection.

FIG. 3 is a schematic diagram illustrating a straight-through connection. Connection 190 includes optical path 191 (a-a) and optical path 192 (b-b). FIG. 4 is a schematic diagram illustrating one embodiment of a crossed over connection. Connection 194 includes optical path 195 (b-a) and optical path 196 (a-b). In one embodiment, an optical fiber connection is rolled over between a straight-through connection and a crossed over connection using a system as described relative to FIGS. 5A, 5B, 6A, and 6B.

Figure 5A:
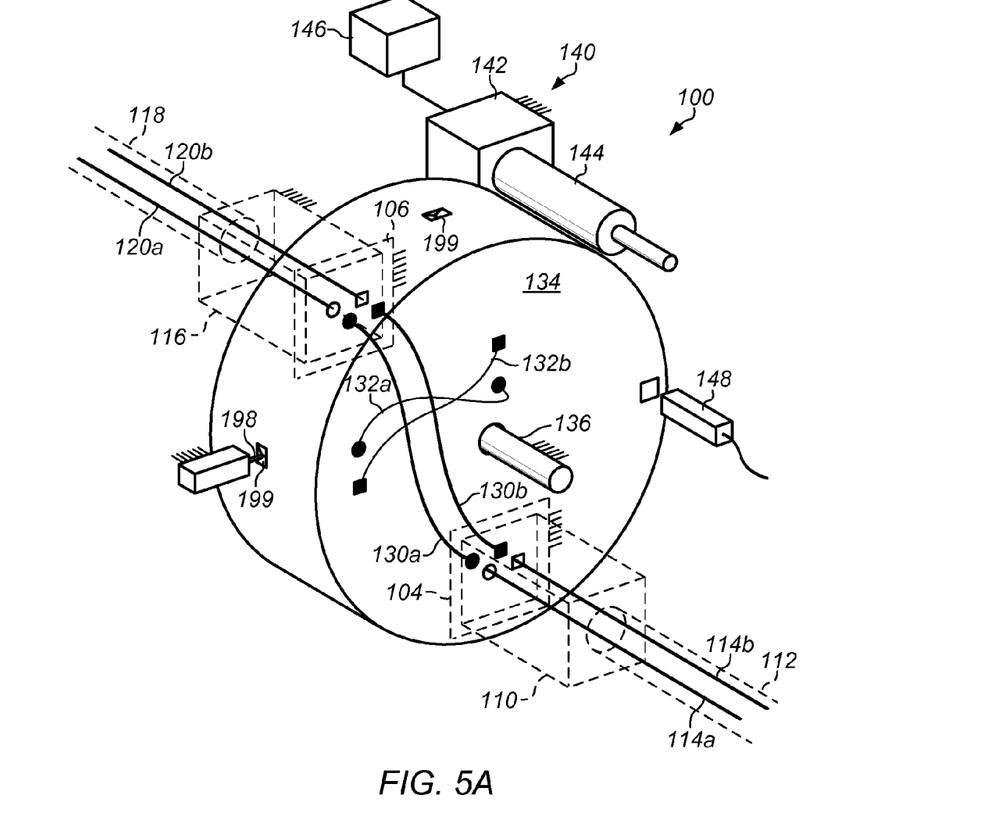
FIG. 5A illustrates one embodiment of a system for establishing an optical fiber connection.
Figure 5B:
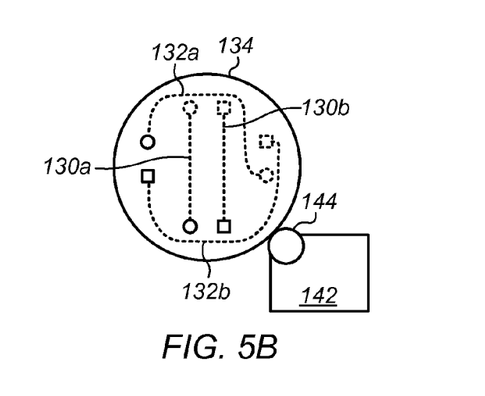
FIG. 5B is a schematic diagram illustrating an arrangement of optical fibers for the position of an optical waveguide carrier shown in FIG. 1.

FIG. 5A illustrates one embodiment of a system for establishing an optical fiber connection. FIG. 5B is a schematic diagram illustrating an arrangement of optical fibers for the position of an optical waveguide carrier shown in FIG. 1. Front-side optical fiber holding device 104 and back-side optical fiber holding device 106 may be attached to fiber optic connection panel 102.

Front-side optical fiber holding device 104 may receive and support fiber optic connector plug 110 of fiber optic cable 112. Fiber optic connector plug 108 may hold optical fibers 114a and 114b in a fixed location relative to fiber optic connection panel 102 when fiber optic connector plug 110 is installed on front-side optical fiber holding device 104.

Back-side optical fiber holding device 106 may receive and support fiber optic connector plug 116 of fiber optic cable 118. Fiber optic connector plug 118 may hold optical fibers 120a and 120b in a fixed location relative to fiber optic connection panel 102 when fiber optic connector plug 116 is installed on back-side optical fiber holding device 106. When both fiber optic connector plug 110 and fiber optic connector plug 116 are installed on fiber optic connection panel 102, a fixed spacing and fixed relative location may be established between the ends of optical fibers 114a and 114b on the front side of fiber optic connection panel 102 and the ends of optical fibers 120a and 120b on the back side of fiber optic connection panel 102.

Fiber optic switching device 108 is housed in fiber optic connection panel 102. Fiber optic switching device 108 includes a first pair of optical waveguides 130a and 130b, a second pair of optical waveguides 132a and 132b, and optical waveguide carrier 134. In the illustrated embodiment, optical waveguide carrier 134 is in the form a disc. Optical waveguide carrier 134 may rotate on shaft 136. Shaft 136 may be attached to fiber optic connection panel 102.

Drive mechanism 140 includes motor 142 and drive roller 144. Motor 142 may be operable to rotate drive roller 144. Drive roller 144 may roll on the outer edge of optical waveguide carrier 134 to rotate optical waveguide carrier 134 on shaft 136. Controller 146 is coupled to drive mechanism 140. Position sensor 148 is included on carrier 134 and coupled to controller 146. Position sensor 148 may be, for example, an optical sensor that senses an indicator element (such as a metal tab) on optical waveguide carrier 134.

The position of a carrier of an optical fiber switching device may be controlled automatically, manually, or a combination thereof. In certain embodiments, a controller includes at least one programmable logic controller. In one embodiment, the PLC may receives measurements of position of the carrier from a position sensor, such as position sensor 148 shown in FIG. 5A. Based on sensor data, the PLC may operate drive mechanism 140 to control a position of the carrier.

Controller 146 may be operated to control drive mechanism 140 to control the position (for example, the angle of rotation) of optical waveguide carrier 134. The position of optical waveguide carrier 134 determines the positions of the first pair of optical waveguides 130a and 130b and the second pair of optical waveguides 132a and 132b.

As illustrated in FIG. 5A, in one position of optical waveguide carrier 134, one end of optical waveguides 130a may align with optical fiber 114a on the front side of fiber optic connection panel 102 and the other end of optical waveguide 130a may align with optical fiber 120a on the back side of fiber optic connection panel 102. Based on this alignment, optical waveguide 130a may optically couple optical fiber 114a and optical fiber 120a. In this same position, one end of optical waveguide 130b may align with optical fiber 114b on the front side of fiber optic connection panel 102 and the other end of optical waveguide 130b may align with optical fiber 120b on the back side of fiber optic connection panel 102. Based on this alignment, optical waveguide 130b may optically couple optical fiber 114b in the front-side fiber pair and optical fiber 120b in the back-side fiber pair. Thus, in this position, optical signals may be transmitted between optical fiber 114a in the front-side fiber pair and optical fiber 120a in the back-side fiber pair, and optical signals may also be transmitted between optical fiber 114b in the front-side fiber pair and optical fiber 120b in the back-side fiber pair.

In some embodiments, signals may be transmitted in both directions through a fiber optic connection. For example, for a first computing device may transmit optical signals to a computing device coupled to optical fibers 120a and 120b using the path formed by optical fiber 114a, optical waveguide 130a, and optical fiber 120a, and the second computing device may transmit optical signals back to the first computing device using the path formed by optical fiber 120b, optical waveguide 130b, and optical fiber 114b.

Figure 6A:
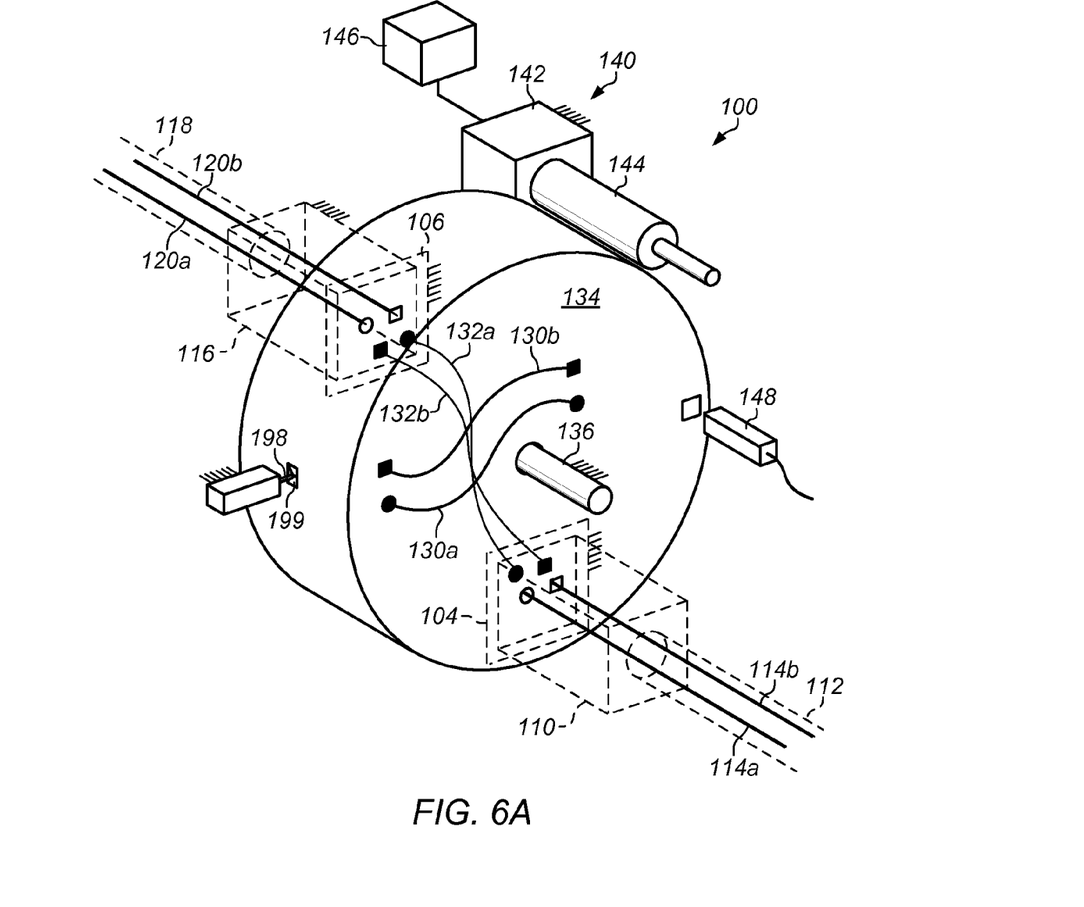
FIG. 6A illustrates an embodiment in which an optical waveguide carrier has been rotated to switch a connection between pairs of optical fibers.
Figure 6B:
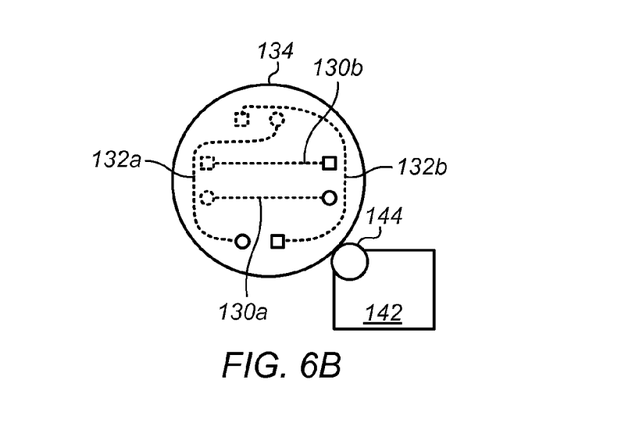
FIG. 6B is a schematic diagram illustrating an arrangement of optical fibers for the position of an optical waveguide carrier shown in FIG. 6.

In some embodiments, a switching device may be operated to rollover a fiber optic connection between a pair of optical fibers. FIG. 6A illustrates an embodiment in which an optical waveguide carrier has been rotated to switch a connection between pairs of optical fibers. FIG. 6A is a schematic diagram illustrating an arrangement of optical fibers for the position of an optical waveguide carrier shown in FIG. 6A. In FIGS. 6A and 6B, optical waveguide carrier 134 has been rotated 90 degrees counter-clockwise from the position shown in FIGS. 5A and 5B. The ends of optical waveguides 132a and 132b may be located on optical waveguide carrier 134 such that, when optical waveguide carrier 134 is rotated to the position shown in FIGS. 6A and 6B, optical waveguides 132*a* and 132*b* may optically couple the front-side optical fiber pair 114*a* and 114*b* and the back-side optical fiber pair 120*a* and 120*b*. However, as shown in FIG. 5A, FIG. 5B, FIG. 6A, and FIG. 6B, the arrangement of the second pair of optical waveguides 132*a* and 132*b* is reversed from the arrangement of the first pair of optical waveguides 130*a* and 130*b*. In particular, the opposite ends of optical waveguides 132*a* and 132*b* cross-over such that, on the front-side of optical waveguide carrier 134, the end of 132*a* is the most-clockwise, while on the back-side of optical waveguide carrier 134, optical waveguide 132*b* is most-clockwise. Because of this cross-over arrangement, the optical connection between front-side optical fiber pair 114*a* and 114*b* and the back-side optical fiber pair 120*a* and 120*b* is reversed such that optical fiber 114*a* optically couples with optical fiber 120*b*, and optical fiber 114*b* optical couples with optical fiber 120*a*.

In some embodiments, a switching device is moved to roll over a fiber optic connection between optical fiber pairs from a straight-through configuration to a crossed-over configuration. For example, to roll over the fiber connection of the system shown in FIG. 5A and FIG. 6A, optical waveguide carrier 134 may be rotated from the position shown in FIG. 5A to the position shown in FIG. 6A. In some embodiments, a roll over is performed on a fiber optic connection to correct a crossed connection at a location than the switching device. For example, if service personnel incorrectly installed a connector on a patch panel such that the fibers were reversed (for example, a-to-b on one line and b-to-a on the other line), the switching device may be used to provide a second reversal of the connection (for example, b-to-on one line and a-to-b on the other line) at the fiber optic connection system that corrects the error by the service personnel.

In some embodiments, an optical fiber switching device includes a self-aligning mechanism for aligning optical elements in an optical transmission path. In certain embodiments, an optical fiber switching device includes a detent mechanism. The detent mechanism may include a resilient device (such as a spring-loaded pin or ball) that holds or aligns optical elements on a carrier in a desired location or alignment.

In system 100 shown in FIG. 5A, spring-loaded pin 198 may be attached to fiber optic connection panel 102. Spring-loaded pin 198 may be resiliently urged into vee-shaped groove 199 of optical waveguide carrier 134. Engagement of spring-loaded pin 198 in groove 199 may promote alignment of optical elements in an optical connection, such as between optical waveguides 130*a* and optical fiber 114*a*.

Although in the detent/alignment mechanism in FIG. 5A is shown in the context of a rotating carrier for illustrative purposes, an alignment or detent device may be included for devices with any type of carrier motion. In another embodiment, for example, an alignment and detent mechanism is included in translating fiber carrier, such as described below relative to FIGS. 7A and 7B.

Any of various fiber optic connector types may be used in a fiber optic connection system. Examples of optical connector types include SC, ST, LC, and MIC. The spacing between fibers in a set of fibers (for example, the spacing between optical fibers in a pair) may vary from embodiment to embodiment, and, within an embodiment, from connection to connection. In some cases, the spacing between the ends of the optical waveguides in a carrier matches the spacing between optical fibers in an optical connector plug of a cable to be installed in the connection system.

In certain embodiments, a set of fibers may be held on a connection panel without a connector plug. For example, the ends of one or more optical fibers may be terminated directly onto a connection panel. In certain embodiments, an optical connection system may include a connector plug/receptacle pair that is optically coupled to a positionable carrier by way of connecting optical waveguides in a connection panel.

Optical Fiber A-B Switch System

In some embodiments, a fiber optic connection system switches one or more optical fibers between two or more different paths. For example, a switching device may switch a pair of optical fibers from one router to another router.

In some embodiments, one side of the fiber optic connection includes an input that can be switched among two or more outputs on the other side of the connection. In some embodiments, one side of the fiber optic connection includes an output that can be switched among two or more inputs on the other side of the connection.

Figure 7A:
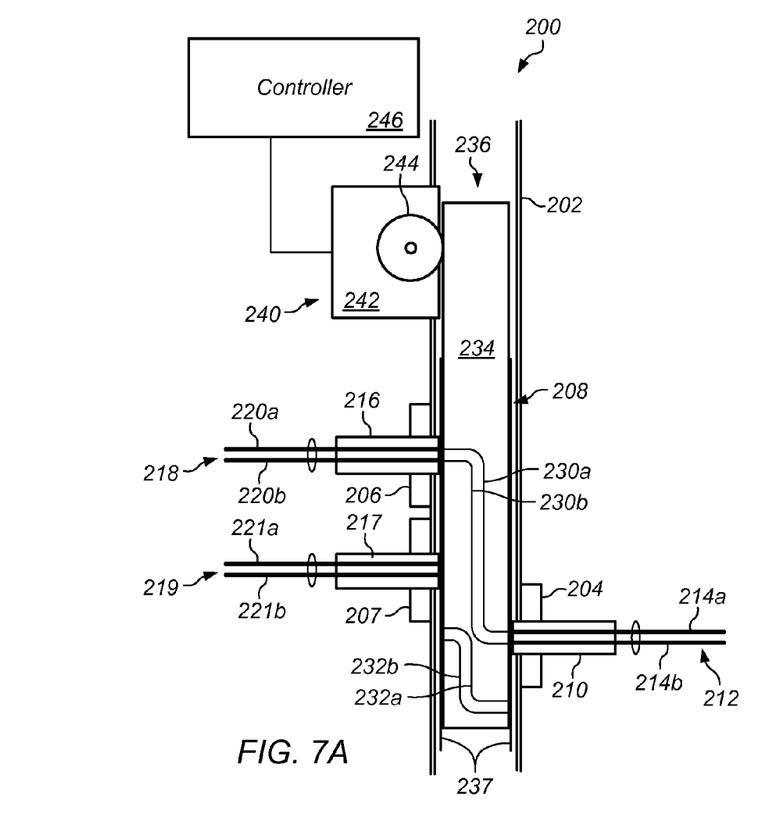
FIGS. 7A and 7B illustrate one embodiment of a fiber optic connection system that can switch a fiber optic connection between two paths.
Figure 7B:
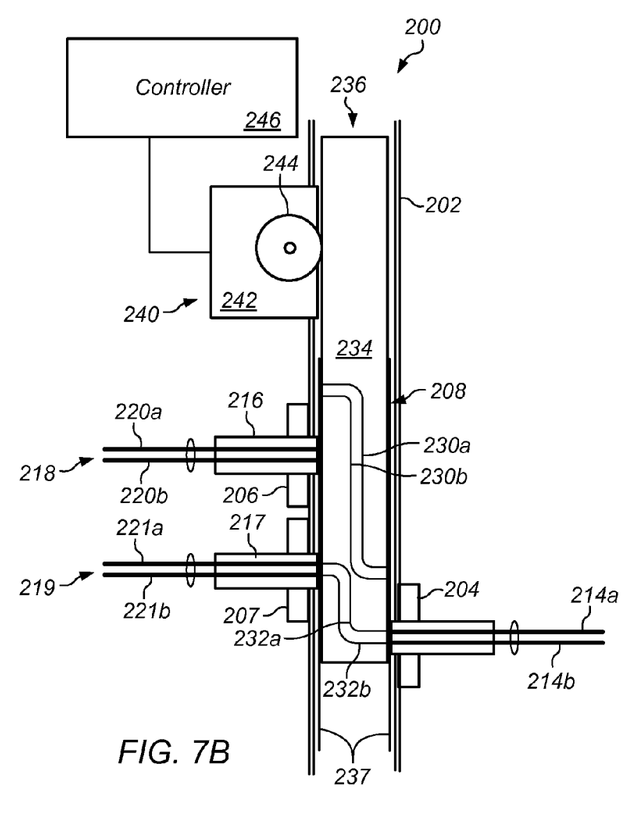

FIGS. 7A and 7B illustrate one embodiment of a fiber optic connection system that can switch a fiber optic connection between two paths. In FIG. 7A, a pair of optical fibers installed on the front side of the fiber optic connection panel (appearing on the in FIG. 7A right side of the page) may be optically coupled to a pair of optical fibers installed in the upper position on the back side of the front panel (appearing in FIG. 7B on the left side of the page). In FIG. 7B, an fiber optic switching element has been moved such that the pair of optical fibers installed on the front side of the fiber optic connection panel optically couples a pair of optical fibers installed in the lower position on the back side of the front panel.

System 200 includes fiber optic connection panel 202, front-side optical fiber holding device 204, upper back-side optical fiber holding device 206, lower back-side optical fiber holding device 207, and fiber optic switching device 208. Front-side optical fiber holding device 204, upper back-side optical fiber holding device 206, and lower back-side optical fiber holding device 207 may be attached to fiber optic connection panel 202.

Front-side optical fiber holding device 204 may receive and support fiber optic connector plug 210 of fiber optic cable 212. Fiber optic connector plug 210 may hold optical fibers 214*a* and 214*b* in a fixed location relative to fiber optic connection panel 202 when fiber optic connector plug 210 is installed on front-side optical fiber holding device 204.

Upper back-side optical fiber holding device 206 may receive and support fiber optic connector plug 216 of fiber optic cable 218. Fiber optic connector plug 218 may hold optical fibers 220*a* and 220*b* in a fixed location relative to fiber optic connection panel 202 when fiber optic connector plug 216 is installed on back-side optical fiber holding device 206.

Lower back-side optical fiber holding device 207 may receive and support fiber optic connector plug 217 of fiber optic cable 219. Fiber optic connector plug 217 may hold optical fibers 221*a* and 221*b* in a fixed location relative to fiber optic connection panel 202 when fiber optic connector plug 217 is installed on back-side optical fiber holding device 207.

When fiber optic connector plug 210, fiber optic connector plug 216, and fiber optic connector plug 217 are installed on fiber optic connection panel 202, a fixed relative location may be established among the ends of optical fibers 214*a* and 214*b* on the front side of fiber optic connection panel 202, the ends of optical fibers 220*a* and 220*b* and optical fibers 221*a* and 221*b* on the back side of fiber optic connection panel 202.

Fiber optic switching device 208 is housed in fiber optic connection panel 202. Fiber optic switching device 108 includes a first pair of optical waveguides 230*a* and 230*b*, a second pair of optical waveguides 232*a* and 232*b*, and optical waveguide carrier block 234. Optical waveguide carrier block 234 may be movable up and down within guide channel 236. Guide channel 236 may be held may be attached to fiber optic connection panel 202. Shields 237 may be provided between optical waveguide carrier block 234 and either side of channel 236. Shields 237 may inhibit contamination of fibers and optical waveguides that are not active at the junction between the carrier and the adjoining members of the connection panel. A shield may be, for example, a film, sheet, or thin plate. A shield may include apertures in suitable locations for light transmission. In certain embodiments, a shield can transmit light.

Drive mechanism 240 includes motor 242 and drive roller 244. Motor 242 may be operable to rotate drive roller 244. Drive roller 244 may roll on the outer edge of optical waveguide carrier block 234 to move optical waveguide carrier block up and down with guide channel 236.

Controller 246 is coupled to drive mechanism 240. Controller 246 may be operated to control drive mechanism 240 to control the position of optical waveguide carrier block 234. The position of optical waveguide carrier block 234 determines the positions of the first pair of optical waveguides 230a and 230b and the second pair of optical waveguides 232a and 232b.

As illustrated in FIG. 7A, in one position of optical waveguide carrier block 234, one end of optical waveguides 230a may align with optical fiber 214a on the front side of fiber optic connection panel 202 and the other end of optical waveguide 230a may align with optical fiber 220a on the back side of fiber optic connection panel 202. Based on this alignment, optical waveguide 230a may optically couple optical fiber 214a and optical fiber 220a in upper back-side holding device 206. In this same position, one end of optical waveguide 230b may align with optical fiber 214b on the front side of fiber optic connection panel 202 and the other end of optical waveguide 230b may align with optical fiber 220b in upper back-side holding device 206. Based on this alignment, optical waveguide 230b may optically couple optical fiber 214b in the front-side fiber pair and optical fiber 220b in the upper back-side fiber pair. Thus, in this position, optical signals may be transmitted between optical fiber 214a in the front-side fiber pair and optical fiber 220a in the upper back-side fiber pair, and optical signals may also be transmitted between optical fiber 214b in the front-side fiber pair and optical fiber 220b in the upper back-side fiber pair.

In FIG. 7B, optical waveguide carrier block 234 has been shifted up in guide channel 236 relative to FIG. 7A such that optical waveguide 232a optically couples optical fiber 214a on the front side of fiber optic connection panel 202 with optical fiber 221a in lower back-side holding device 207, and optical waveguide 232b optically couples optical fiber 214b on the front side of fiber optic connection panel 202 with optical fiber 221b in lower back-side holding device 207. Thus, in the position shown in FIG. 7B, optical signals may be transmitted between optical fiber 214a in the front-side fiber pair and optical fiber 221a in the lower back-side fiber pair, and optical signals may be transmitted between optical fiber 214b in the front-side fiber pair and optical fiber 221b in the lower back-side fiber pair.

Controller 246 may be operated to control drive mechanism 234 to selectively couple the optical fiber pair on the front side of fiber optic connection panel 202 with either the upper pair of fibers on the backside of or the lower pair of fibers on the back side of fiber optic connection panel 202.

In the embodiment shown in FIGS. 7A and 7B, the connection panel provides for switching of a single pair of optical fibers on one side of a connection between alternate pairs of fibers on the other side of the panel. A connection panel may, however, include, in various embodiments, one or more switching devices for switching of any number of optical fibers, among any number of lines, inputs, or outputs. For example, a switching device may switch an input set of three or more optical fibers among four or more different output sets of optical fibers.

In some embodiments, a fiber optic connection system automatically switches a fiber optic connection upon the occurrence of an event or condition. For example, in one embodiment, a fiber optic connection system automatically switches one side of a fiber optic connection to a back-up system upon receiving a notification of a failure in a primary system. For example, controller 246 may automatically switch a connection of the front-side fiber pair from the upper backside fiber pair to the lower backside fiber pair upon receiving notification of a failure in the system connected to upper backside fiber pair.

In the embodiment shown in FIGS. 7A and 7B, optical waveguide carrier block 234 may translate up and down to switch a connection among optical fibers. A switching device may, nevertheless, in some embodiments include carrier that moves optical elements in other manners. For example, a fiber optic connection system may include a rotating carrier similar to the carrier shown in FIGS. 5A and 6A, but with an arrangement of optical waveguides that switch among optical fiber sets on one side of the rotating carrier.

Figure 8A:
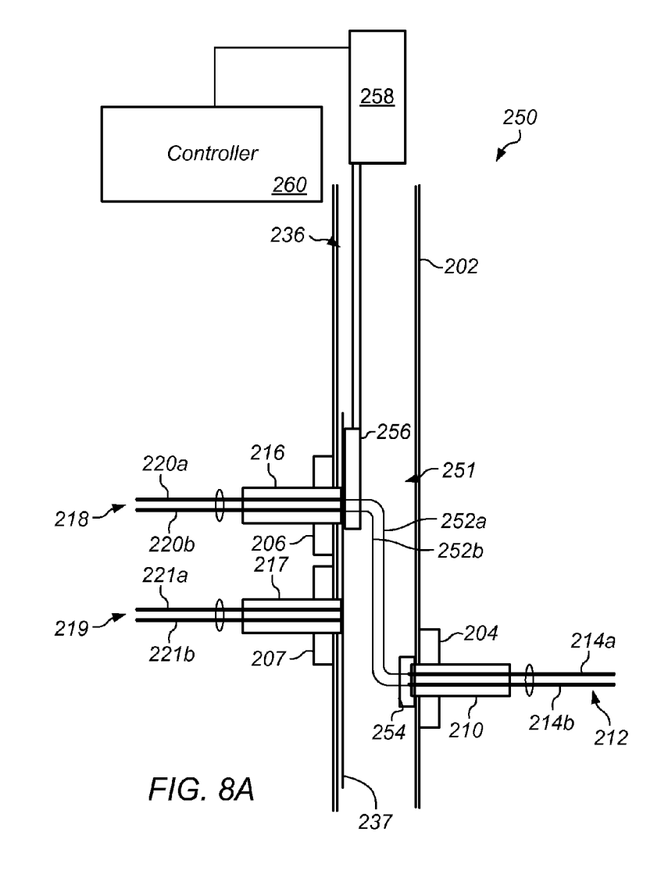
FIGS. 8A and 8B illustrate one embodiment of a fiber optic connection system with a carrier that switches a set of optical waveguides between two fiber optic connectors.
Figure 8B:
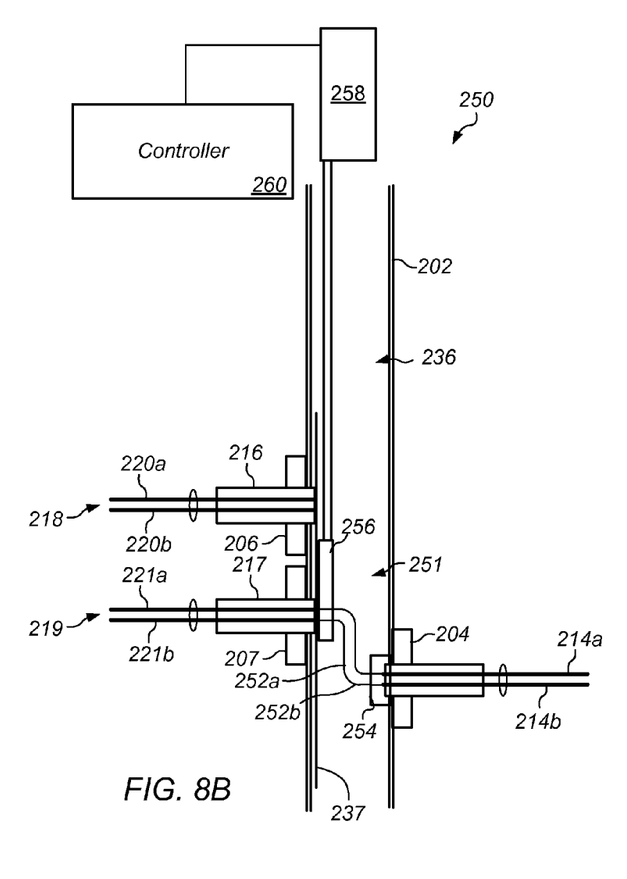

FIGS. 8A and 8B illustrate one embodiment of a fiber optic connection system with a carrier that switches a set of optical waveguides between two fiber optic connectors. Fiber optic connection system 250 includes fiber optic switching device 251. The arrangement of cables, connectors, and fibers installed on the panel may be similar to that described above relative to FIGS. 7A and 7B. Fiber optic switching device 251 includes optical waveguides 252a and 252b, waveguide holder 254, and waveguide carrier 256. Waveguide holder 254 holds the front end of each of optical waveguides 252a and 252b in alignment with optical fibers 214a and 214b. Waveguide carrier 256 is coupled to linear actuator 258 and holds the rear end of each of optical waveguides 252a and 252b. Controller 260 may operate linear actuator 258 to move waveguide carrier 256 up and down in channel 236. Waveguide carrier 258 may be positioned to optically couple the ends of optical waveguides 252a and 252b with optical fibers in connector plugs 216 or 217.

Figure 9A:
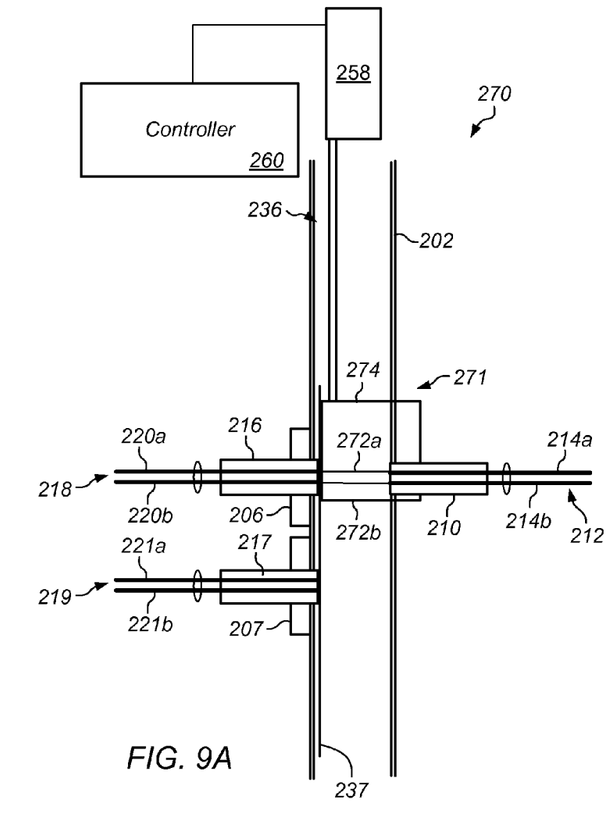
FIGS. 9A and 9B illustrate one embodiment of a fiber optic connection system with a carrier that moves a connector on one side of a panel to switch between two connectors on the other side of the panel.
Figure 9B:
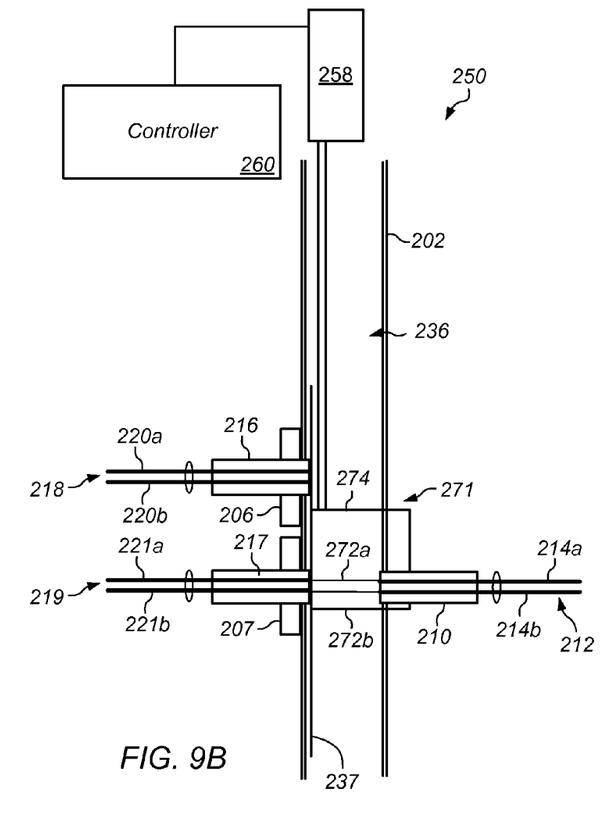

FIGS. 9A and 9B illustrate one embodiment of a fiber optic connection system with a carrier that moves a connector on the front of a panel to switch between two connectors on the rear of the panel. Fiber optic connection system 270 includes fiber optic switching device 271. The arrangement of cables, connectors, and fibers installed on the panel may be similar to that described above relative to FIGS. 7A and 7B. Fiber optic switching device 271 includes optical waveguides 272a and 272b and carrier 274. Carrier 274 is coupled to linear actuator 258. Carrier 274 carries optical waveguides 272a and 272b and connector plug 210. Controller 260 may operate linear actuator 258 to move carrier 274 up and down in channel 236. Carrier 274 may be positioned to optically couple the ends of optical waveguides 272a and 272b with optical fibers in connector plugs 216 or 217.

In certain embodiments, a connection may be switched by moving a set of fibers on one side of connection between two or more locations. Each of the locations may provide a connection with a different set of fibers. In one embodiment, a carrier holding a set of fibers is slid up or down to change a connection from a first set of fibers on the other side of the connection to second set of fibers on the other side of the connection.

Figure 10:
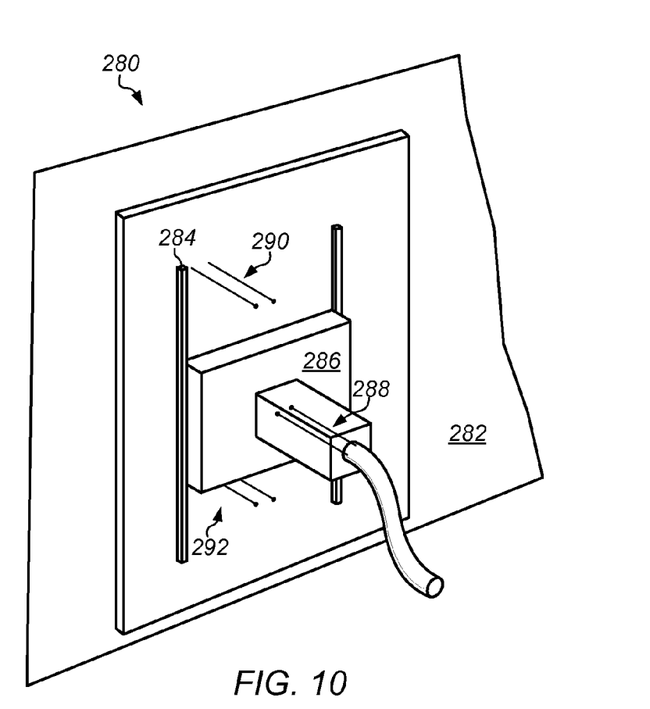
FIG. 10 illustrates a connection panel that includes an optical fiber carrier for switching between one connection and another.

FIG. 10 illustrates a connection panel that includes an optical fiber carrier for switching between one connection and another. System 280 includes connection panel 282, rails 284, and carrier 286. Carrier 286 may hold optical fibers 288. Carrier 286 may slide up and down on rails 284 to selectively optical couple fibers 288 to optical fibers 290 or 292 on connection panel 282. In some embodiments, the position of carrier 286 is controlled by a drive mechanism, such as describe above relative to FIGS. 7A and 7B. In some embodiments, carrier 286 is positioned manually.

Figure 11:
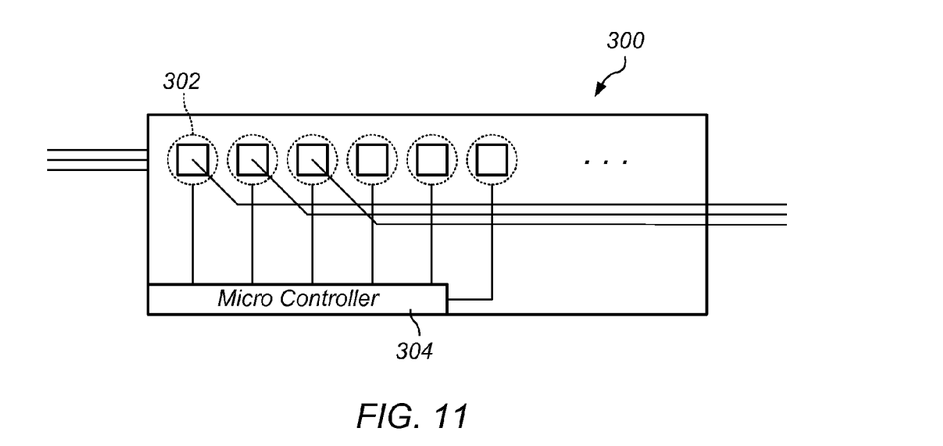
FIG. 11 illustrates one embodiment of a connection panel system that includes optical fiber switching devices for multiple fiber optic connections.

FIG. 11 illustrates one embodiment of a connection panel system that includes optical fiber switching devices for multiple fiber optic connections. Connection panel system 300 includes rollover devices 302, and controller 304. In one embodiment, each of rollover devices 302 includes a rotating disc. Each rollover device 302 may be positionable to rollover an optical fiber connection. Controller 304 may be operated to control each of rollover devices 302.

Figure 12:
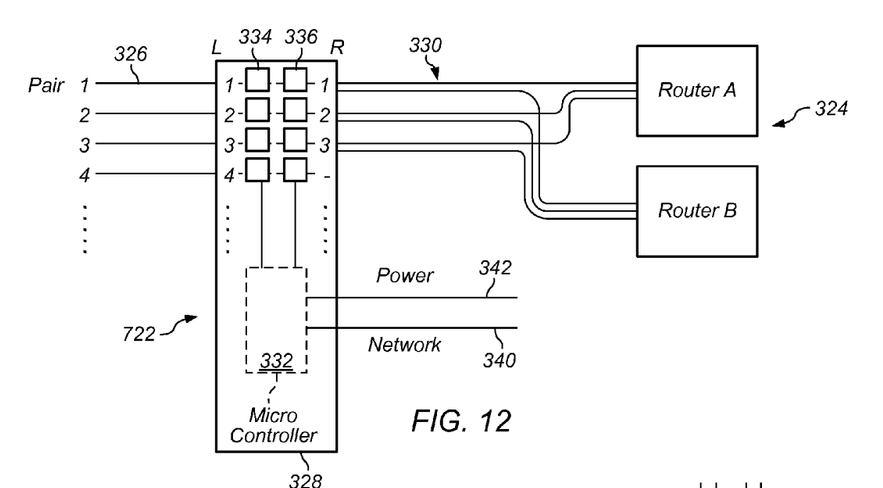
FIG. 12 is a schematic diagram illustrating one embodiment of a fiber optic connection system with rollover and switching of multiple fiber optic connections.

In some embodiments, an optical fiber connection system may allow rollover of connector pairs and switching of connections among multiple outputs. FIG. 12 is a schematic diagram illustrating one embodiment of a fiber optic connection system with rollover and switching of multiple fiber optic connections. System 320 includes fiber optic connection panel system 322, routers 324, fiber optic lines 326, and fiber optic lines 328. Each of fiber optic lines 326 and 328 may be, for example, a pair of optical fibers. Each of fiber optic lines 326 and fiber optic lines 328 may be connected on fiber optic connection panel system 328 on a separate channel 330.

Fiber optic connection panel system 322 includes controller 332, rollover devices 334, and switching devices 336. Each of rollover devices 334 and switching devices 336 may be coupled to controller 336 on a separate one of channels 330.

Each of rollover devices 334 may be operable by controller 332 to rollover one of a fiber optic connection between one of fiber optic lines 326 and fiber optic lines 328. Each of switching devices 336 may be operable by controller 332 to switch a connection among one of routers 324 (for example, from Router A and router B, or vice versa). Controller 332 may include network connection 340 and power connection 342. Fiber optic connection panel system 322 may receive operating power over power connection 342. Controller 332 may send and receive information relating to switching and rollover operations by way of network connection 340. In some embodiments, an external device may control operations in one or more of rollover devices 334 or switching devices 336.

In some embodiments, rollover devices 334 or switching devices 336 are controlled in response to information from sensors coupled to controller 332 or an external system. In one embodiment, rollover devices 334 or switching devices 336 is moved in response to an external signal, such as a "no light" signal for one or more of the fibers in the connection.

Figure 13A:
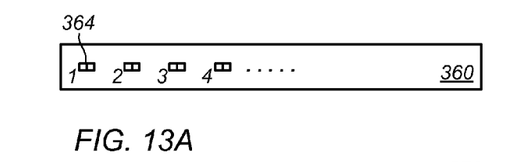
FIGS. 13A-13C are panel layouts illustrating a fiber optic connection system that includes rollover and switching of multiple fiber optic connections.
Figure 13B:
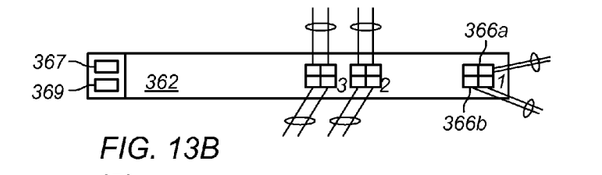
Figure 13C:
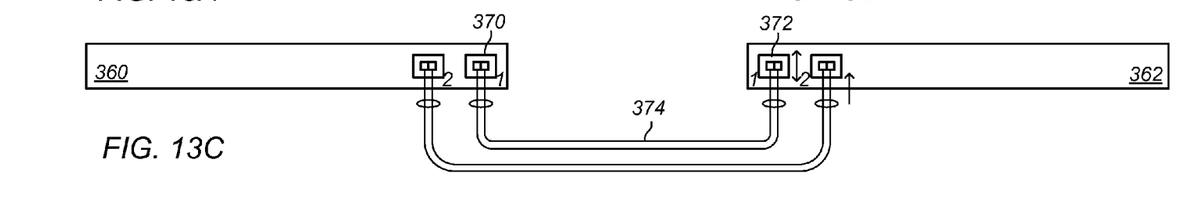

FIGS. 13A-13C are panel layouts illustrating a fiber optic connection system that includes rollover and switching of multiple fiber optic connections. The fiber optic connection system may include front panel 360 and rear panel 362. The panel layouts may be implemented in a system such as the one shown schematically in FIG. 12.

In the embodiment illustrated in FIG. 12A, the outside of front panel 360 of the fiber optic connection system includes fiber connector receptacles 364. Each of connector receptacles may receive an optical fiber cable. Fiber connector receptacles 364 may receive a pair of fibers. Fiber connector receptacles may be of any suitable types. Examples of fiber connector types include LC, SC, and ST.

In the embodiment illustrated in FIG. 13B, the outside of rear panel 362 of the fiber optic connection system includes connector receptacles 366A and connector receptacles 366B. Each of connector receptacles may receive an optical fiber cable. Rear panel 362 includes network connector receptacle 367 and power connector receptacle 369. Network connector receptacle 367 may provide a connection between a controller in the fiber optic connection system and external devices. Power connector receptacle 369 may connect devices in fiber optic connection system to external sources of electrical power.

In the embodiment illustrated in FIG. 13B, the inside of front panel 360 of the fiber optic connection system includes rollover devices 370. Each of rollover devices 370 may be operable to rollover one of a fiber optic connection for lines corresponding to one of fiber connector receptacles 364. The inside of rear panel 362 of the fiber optic connection system includes switching devices 372. Fiber optic lines 374 may couple fibers installed in front panel 360 with fibers installed in rear panel 362. Each of switching devices 372 may be operable to switch a connection from fiber connector receptacle 366A to fiber connector receptacle 366B, and vice versa. Switching between fiber connector receptacles 366A and 366B may allow switching of a fiber pair in one of connector receptacles 364 on front panel 360 between two different routers coupled to receptacles in rear panel 362.

In one embodiment of a connection system such as shown in FIGS. 12 and 13A-13C, on the interior on the front side are discs having 2 fiber strands lined up in the middle. To roll the cable over, the disc may be turned 180 degrees. On the back exterior are 2 fiber optic connectors for each 1 connector on the front (for example, 24 connectors on the back for 12 on the front). One connector in each pair may go to router A, the other to router B. In one embodiment, on the interior on the back side are moving carriers that slide up and down, to make a connection with either router A or router B. These moving carriers may be manipulated using a motor or a sliding mechanism. In one embodiment, the carriers are made of plastic. An operator can remotely roll the fiber (causes the disc on the front to rotate 180 degrees) or switch from router A to B or back (causes the piece on the back to slide up or down)

In various embodiments, described above, systems, devices, and methods described herein are used to establish connections are made between optical fiber sets on opposing sides of connection panel. Connections between sets of optical fiber sets, nevertheless, may in some embodiments be made between fibers in any physical relationship to one another. In various embodiments, for example, rollover devices, A-B switching devices, or both, may be used to connect sets of one or more fibers on the same side of a connection panel.

In various embodiments described herein, drive mechanisms for an optical waveguide carrier include an electric motor that rotates the carrier. Fiber optic connection systems may, however, include any suitable mechanisms and components for moving carrier. A drive mechanism may include, for example, an electric motor, a stepper motor, a solenoid, a gear box, or linear actuator, pneumatic actuator, or combinations thereof. In some embodiments, a carrier is operated using a direct drive mechanism. For example, in the connection system shown in FIGS. 5A, 5B, 6A, and 6B, controller 146 may operate a stepper motor that is directly coupled to carrier 134, instead of drive mechanism 142 and rollers 144.

In some embodiments, each switch device in a connection system may include may be positioned by a separate drive mechanism. In other embodiments, one drive mechanism may control two or more switching devices. For example, two or more carriers may be commonly coupled to a single actuator or motor by way of a linkage.

Figure 14:
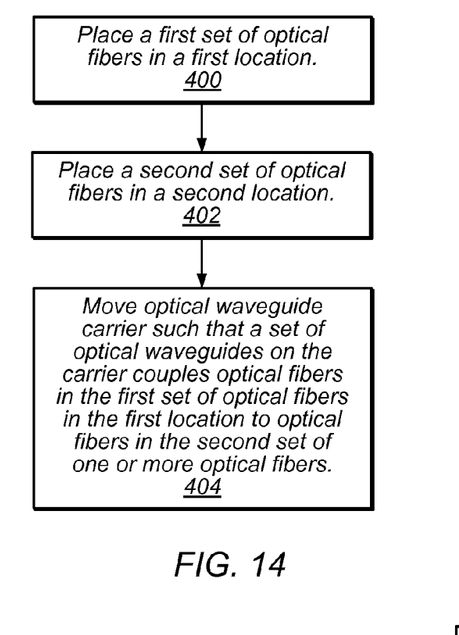
FIG. 14 illustrates one embodiment of establishing a connection between optical fibers that includes moving a waveguide carrier to position one or more waveguides to optically couple sets of optical fibers.

FIG. 14 illustrates one embodiment of establishing a connection between optical fibers that includes moving a waveguide carrier to position one or more waveguides to optically couple sets of optical fibers. At 400, the ends of a first set of one or more optical fibers are placed in a first location. At 402, the ends of a second set of one or more optical fibers are placed in a second location. Each of the sets of fibers may be, in one embodiment, a pair of optical fibers on either side of a connection panel. In some embodiments, the ends of each of the sets of the optical fibers are in fiber optic connector plugs. The ends of the optical fibers may be placed by installing the fiber optic connectors, for example, on opposing sides of a connection panel.

At 404, an optical waveguide carrier is moved such that a set of optical waveguides on the carrier optically couples optical fiber in the first set of optical fibers in the first location to optical fibers in the second set of one or more optical fibers.

In many of the embodiments described above, a carrier is translated to produce translation in the ends of the fibers carried by the carrier, or rotated to produce circumferential motion. Motion of optical elements on a carrier may, however, be in various embodiments of any form, including linear, arcuate, eccentric, or irregular. In some embodiments, a carrier moves the ends of a set of waveguides within a plane (such as, for example, as shown in FIGS. 5A and 5B or FIGS. 7A, and 7B. In various embodiments, moving an optical waveguide may include rotating the carrier, translating the carrier, or a combination thereof.

In some embodiments, moving an optical waveguide carrier rolls over a fiber optic connection, such as described above schematically relative to FIGS. 3 and 4. In some embodiments, a rollover may be carried out to correct a fault condition, such as a cross connection of fibers in a pair. In some embodiments, a connection panel may be operated to roll over two or more fiber optic connections in the connection panel.

In some embodiments, moving an optical waveguide carrier switches a connection of a set of fibers. For example, a set of fibers may be switched from a connection with one router and another router. In certain embodiments, switching may occur automatically upon the occurrence of an event or a condition. For example, a connection may be switched upon detection of a system failure.

In some embodiments, a carrier is moved by operating a drive mechanism coupled to the motor. In some embodiments, the position of the carrier is controlled based on feedback, for example, from a position sensor on the carrier.

Figure 15:
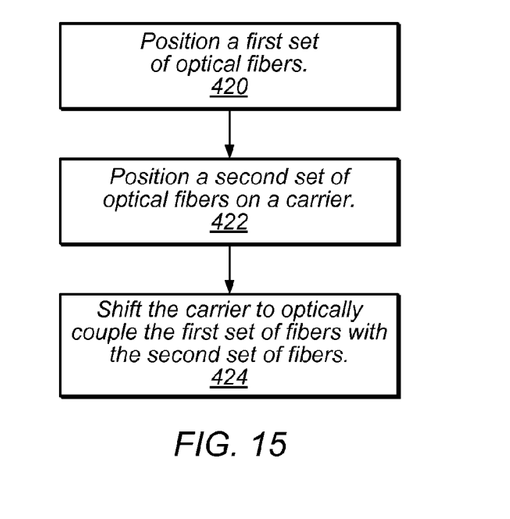
FIG. 15 illustrates one embodiment of establishing a connection between optical fibers that includes moving a carrier to shift one set of optical fibers into alignment with another set of optical fibers.

FIG. 15 illustrates one embodiment of making a connection between optical fibers that includes moving a carrier to shift one set of optical fibers into or out of alignment with another set of optical fibers. At 420, at first set of one or more fibers is positioned. The first set of fibers may be positioned for example, in a connector plug in a holding device on a fiber optic connection panel.

At 422, at second set of one or more optical fibers is positioned on a carrier. In certain embodiments, the second set of optical fibers may be in a connector plug that is installed in the carrier, such as described above relative to FIGS. 9A and 9B.

At 424, the carrier is shifted to optically couple the first set of fibers with the second set of fibers. In some embodiments, the carrier moves the ends of the second set of fibers into alignment with the first set of fibers. In one embodiment, movement of the ends of the optical fibers is within a plane. For example, in system 270 shown in FIGS. 9A and 9B, carrier 272 may move the ends of fibers 214a and 214b in within a plane at the front panel of system 270.

Although in many of the embodiments described above, connection systems have been described as making a connection between fibers or switch between two different sets of fibers, connection systems may in some embodiments be used to break an optical connection. For example, a controller may move a carrier from a position in which sets of fibers are optically coupled to one another to another position in which the sets of fibers are optically decoupled.

In some embodiments, fiber optic connection systems as described above may be fail-static. After a loss of power to the system, the fiber optic connection may remain in the state that it was in at the time power was lost. For example, if fiber pairs were coupled in a rollover arrangement when power was lost, the fibers may remain in the rollover arrangement.

Example Use Case

Fiber optic connection systems and methods described above may be used in a variety of environments. In some embodiments, an operator of a provider network establishes dedicated private network paths between its data centers and one or more routers that are physically located at a facility remote from the data centers. The facilities at which these routers are housed may be referred to as "router co-location facilities", as they may sometimes house routers and other network equipment owned and/or managed by business entities other than the provider network's operator, such as by independent network service providers or by the clients themselves. Routers owned or managed by, or on behalf of, the provider network operator at the router co-location facilities may be referred to as "endpoint" routers, as they may represent the furthest points to which the provider network's control or ownership of network equipment extends. For example, only traffic that has passed through a device owned or managed by the provider network operator, and therefore complies with policies set by the provider network operator, may be allowed on the private paths between the endpoint routers and other components of the provider network. In some embodiments one or more other routers at the router co-location facilities may be part of a client network—for example, such routers may owned and/or managed by or on behalf of the clients, or the other routers may have private connectivity to the systems at which clients of the provider network generate service requests for the provider network. These other routers may be referred to as "client-side" routers.

In some embodiments, one or more collections or pools of resources at a data center may be allocated for use by a particular client, for example, to implement functionality needed to satisfy services requested from devices of the client network. In such an embodiment, a connectivity coordinator may be operable to receive a request to establish dedicated connectivity from a client to one or more of the resource pools. The connectivity request may be generated or formatted to conform to the interface implemented by the connectivity coordinator—for example, it may be received via a web-based form submission in a case where the interface is presented to the client as a set of web pages. In response to the request for dedicated connectivity, the connectivity coordinator may select a particular endpoint router from among the set of endpoint routers of the provider network as the target router from which dedicated connectivity is to be provided to the requesting client. For example, the target router may be selected from the available endpoint routers at a router co-location facility geographically closest to the client's premises, at which the client has access to an existing client-side router. In some implementations the interface may allow the client to specify various details in the request that may help the connectivity coordinator choose an appropriate target endpoint router, such as one or more names and/or addresses of router co-location facilities, a desired bandwidth, desired price ranges, and the like.

In some embodiments, a client may specify a desired bandwidth for the dedicated connectivity. The interface provided to the client by connectivity provider may, for example, allow the client to choose among a discrete set of bandwidth choices such as 500 Megabits/second, 1 Gigabit/second or 10 Gigabits/second, where the choices may be derived from the details of the specific networking hardware available for establishing a physical link to an endpoint router. For example, at some router co-location facilities, the choices for physical links may include 1 Gbps 1000BASE-LX (1310 nm) single-mode fiber connections over single-mode fiber, and 10 Gbps 10 GBASE-LR (1310 nm) single-mode fiber connections over single-mode fiber, and a connectivity coordinator may allow the client to choose between the 1 Gbps option and the 10 Gbps option. In other cases the client may be allowed to request any arbitrary bandwidth and the connectivity coordinator may respond to the request by indicating the bandwidth it is able or willing to provide. In one implementation, the connectivity coordinator may indicate that more than one physical link may be needed—for example, if the customer requests 20 Gbps and the maximum bandwidth available over a single cable is 10 Gbps. In one embodiment, multiple physical links are distributed over different router co-location facilities in response to a single request for dedicated connectivity—for example, if a particular client has access to client-side routers at different facilities, one or more physical links may be set up at each facility if needed or requested. The interface provided by the connectivity coordinator may allow clients to specify whether distinct physical locations should be used to provide the desired connectivity, and if so, how many locations should be used.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system for rolling over a fiber optic connection, comprising:
    a fiber optic switching device, comprising:
        a first pair of non-intersecting optical waveguides;
        a second pair of non-intersecting optical waveguides;
        an optical waveguide carrier configured to carry the first pair of non-intersecting optical waveguides and the second pair of non-intersecting optical waveguides;
    a first optical fiber holder configured to hold a first pair of optical fibers at a first location relative to the optical waveguide carrier; and
    a second optical fiber holder configured to hold a second pair of optical fibers at a second location relative to the optical waveguide carrier;
    wherein the optical waveguide carrier is movable at least between a first position and a second position,
    wherein, when the optical waveguide carrier is in the first position, the first pair of non-intersecting optical waveguides is configured to optically couple the first pair of optical fibers to the second pair of optical fibers in a first combination,
    wherein, when the optical waveguide carrier is in the second position, the second pair of non-intersecting optical waveguides is configured to optically couple the first pair of optical fibers to the second pair of optical fibers in a second combination, wherein the second combination crosses the connection of the optical fibers relative to the first combination.

2. The system of claim 1, wherein each of the optical waveguides in the first pair of optical waveguides comprises a first end and a second end,
    wherein each of the optical waveguides in the second pair of optical waveguides comprises a first end and a second end,
    wherein moving the optical waveguide carrier to the first position aligns the first ends of the first pair of optical waveguides with the first fiber optic pair and aligns the second ends of the first pair of optical waveguides with the second fiber optic pair in the first combination,
    wherein moving the optical waveguide carrier to the second position aligns the first ends of the second pair of optical waveguides with the first fiber optic pair and aligns the second ends of the second pair of optical waveguides with the second fiber optic pair in the second combination.

3. The system of claim 1, wherein the optical waveguide carrier is movable between the first position and the second position by rotating the optical waveguide carrier.

4. The system of claim 1, wherein the system is configured to transmit optical signals from a first optical fiber in the first pair of optical fibers to a first optical fiber in the second pair of optical fibers,
    wherein the system is configured to transmit optical signals from a second optical fiber in the second pair of optical fibers to a second optical fiber in the first pair of optical fibers.

5. The system of claim 1, further comprising a drive mechanism configured to move the optical waveguide carrier between at least the first position and the second position.

6. The system of claim 5, further comprising a controller configured to control the drive mechanism to move the optical waveguide carrier between at least the first position and the second position.

7. The system of claim 1, wherein at least one of the first optical fiber holder and the second optical fiber holder hold a fiber optic connector plug carrying one of the pairs of optical fibers.

8. A fiber optic connection system, comprising:
    a fiber optic switching device, comprising:
        one or more non-intersecting optical waveguides; and
        an optical waveguide carrier configured to carry the one or more non-intersecting optical waveguides;
    a first optical fiber holder configured to hold a first set of one or more optical fibers at a first location relative to the optical waveguide carrier; and
    a second optical fiber holder configured to hold a second set of one or more optical fibers at a second location relative to the optical waveguide carrier;
    wherein the optical waveguide carrier is movable to position at least one of the one or more non-intersecting optical waveguides such that the at least one of the one or more non-intersecting optical waveguides optically couples at least one of the one or more optical fibers in the first set of optical fibers to at least one of the one or more optical fibers in the second set of optical fibers;

wherein the one or more non-intersecting optical waveguides are positionable to reverse a connection between a pair of fibers in the first set of one or more optical fibers and a pair of fibers in the second set of one or more optical fibers.

9. The system of claim 8, wherein the optical waveguide carrier is movable to break an optical connection between the first set of optical fibers and the second set of optical fibers.

10. The system of claim 8, wherein the first set of one or more optical fibers is held on a first side of a fiber optic connection panel, wherein the second set of one or more optical fibers is held on a side of the fiber optic connection panel opposite the first side.

11. The system of claim 8, wherein at least one of the optical waveguides comprises a first end and a second end, wherein moving the optical waveguide carrier comprises aligning the first end of the at least one optical waveguide with at least one optical fiber in the first set of one or more optical fibers and pair and aligning the second end of the at least one optical waveguide with at least one optical fiber in the second set of one or more optical fibers.

12. The system of claim 8, wherein at least one of the optical waveguides is positionable by rotating the optical waveguide carrier.

13. The system of claim 8, wherein at least one of the optical waveguides is positionable by translating the optical waveguide carrier.

14. The system of claim 8, further comprising a drive mechanism configured to move the optical waveguide carrier between a first position and a second position.

15. The system of claim 8, wherein the one or more optical waveguides are positionable to switch a connection of one or more optical fibers in the first set of one or more optical fibers from one of the optical fibers in the second set of optical fibers to another of the optical fibers in the second set of optical fibers.

16. The system of claim 8, wherein the one or more optical waveguides are positionable between at least a first position and a second position to reverse a connection between a pair of fibers in the first set of one or more optical fibers and a pair of fibers in the second set of one or more optical fibers, and wherein the one or more optical waveguides are positionable between at least two positions other than the first position and the second position to switch a connection of one or more optical fibers in the first set of one or more optical fibers from one of the optical fibers in the second set of optical fibers to another of the optical fibers in the second set of optical fibers.

17. The system of claim 8, further comprising a drive mechanism and a controller, wherein the controller is configured to control the drive mechanism to move the optical waveguide carrier between a first position and a second position.

18. The system of claim 17, wherein the controller is configured to move the optical waveguide carrier to switch a connection of one or more optical fibers in the first set of one or more optical fibers from one of the optical fibers in the second set of optical fibers to another of the optical fibers in the second set of optical fibers in response to a signal.

19. The system of claim 17, wherein the controller is configured to move the optical waveguide carrier between the first position and the second position based on an indication of a light level sensed in one or more of the optical fibers.

20. The system of claim 17, further comprising a position sensing device coupled to the controller, wherein the position sensing device is configured to sense at least one position of the optical waveguide carrier.

21. The system of claim 20, wherein controller is configured to establish at least one connection between at least one optical fiber in the first set of one or more optical fibers and at least one optical fiber in the second set of one or more optical fibers based on information from the position sensing device.

22. The system of claim 8, wherein at least one of the first optical fiber holder and the second optical fiber holder hold one or more fiber optic connector plugs carrying at least one of the optical fibers in one of the sets of one or more optical fibers.

23. The system of claim 8, further comprising at least one shield configured to inhibit contamination at one or more ends of one or more optical waveguides of the switching device.

24. The system of claim 8, further comprising at least one alignment device configurable to promote alignment of at least one end of at least one of the optical waveguides with at least one of the one or more optical fibers in at least one of the sets of one or more optical fibers.

25. The system of claim 8, wherein the system is configured to maintain a connection between the optically coupled fibers in the event of a loss of power to the system.

26. A fiber optic connection panel system, comprising:

two or more receptacles configured to receive one or more optical fibers; and one or more fiber optic switching devices, wherein each of at least one of the one or more fiber optic switching devices comprises:

two or more non-intersecting optical waveguides; and an optical waveguide carrier configured to carry the two or more non-intersecting optical waveguides, wherein at least one of the optical waveguide carriers is movable to position at least one of the two or more non-intersecting optical waveguides to optically couple at least one optical fiber received in a first one of the two or more receptacles with at least one optical fiber received in a second one of the two or more receptacles in a first coupling combination; and wherein the at least one of the optical waveguide carriers is movable to position at least another of the two or more non-intersecting optical waveguides to optically couple the at least one optical fiber received in the first one of the two or more receptacles with the at least one optical fiber received in the second one of the two or more receptacles in a second coupling combination, wherein the second coupling combination crosses the coupling of the optical fibers relative to the first coupling combination.

27. The fiber optic connection panel system of claim 26, wherein the one or more fiber optic switching devices comprise two or more fiber optic switching devices, wherein each of at least two of the two or more fiber optic switching devices is configured to optically couple at least one optical fiber received in at least one of the two or more receptacles with at least one optical fiber received in another one of the two or more receptacles.

28. The fiber optical connection panel system of claim 26, further comprising a controller configured to automatically control at least one of the one fiber optic switching devices to establish a connection between optical fibers in at least one of the two or more receptacles.

29. The fiber optical connection panel system of claim 26, wherein at least one of the one or more fiber optic switching devices is configured to roll a connection between pairs of optical fibers in at least two of the two or more receptacles.

30. The fiber optical connection panel system of claim 26, wherein at least one of the one or more fiber optic switching devices is configured to switch a connection of optical fibers in at least one of the two or more receptacles between at least two other ones of the two or more receptacles.

31. A method, comprising:
    placing the ends of a first set of one or more optical fibers in a first location;
    placing the ends of a second set of one or more optical fibers in a second location;
    moving an optical waveguide carrier at least between a first position to a second position, such that:
        when the carrier is in the first position, a first set of one or more non-intersecting optical waveguides on the carrier optically couples at least one optical fiber in the first set of one or more optical fibers in the first location to at least one optical fiber in the second set of one or more optical fibers in the second location in a first combination, and
        when the carrier is in the second position, a second set of one or more non-intersecting optical waveguides on the carrier optically couples the at least one optical fiber in the first set of one or more optical fibers in the first location to the at least one optical fiber in the second set of one or more optical fibers in the second location in a second combination that crosses the connection of the optical fibers relative to the first combination.

32. The method of claim 31, wherein moving the optical waveguide carrier comprises rolling a fiber connection between two pairs of optical fibers.

33. The method of claim 31, wherein moving the optical waveguide carrier comprises switching a connection of at least one optical fiber in the first set of one or more optical fibers from at least a first one of the optical fibers in the second set of one or more optical fibers to at least a second one of the optical fibers in the second set of one or more optical fibers.

34. The method of claim 31, further comprising detecting a failure, wherein switching the connection comprises a controller switching the connection in response to detecting the failure.

35. The method of claim 31, wherein moving the optical waveguide carrier comprises breaking an optical connection between two pairs of optical fibers.

36. The method of claim 31, wherein moving the optical waveguide carrier comprises rotating a disc carrying the one or more optical waveguides.

37. The method of claim 31, further comprising:
    sensing a position of the optical waveguide carrier; and
    controlling a position of the optical waveguide carrier based on the sensed position of the optical waveguide carrier.

* * * * *